(12) United States Patent
Takeda et al.

(10) Patent No.: US 11,716,730 B2
(45) Date of Patent: Aug. 1, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 79 days.

(21) Appl. No.: 16/767,668

(22) PCT Filed: Nov. 30, 2018

(86) PCT No.: PCT/JP2018/044207
§ 371 (c)(1),
(2) Date: May 28, 2020

(87) PCT Pub. No.: WO2019/107548
PCT Pub. Date: Jun. 6, 2019

(65) Prior Publication Data
US 2020/0383104 A1    Dec. 3, 2020

(30) Foreign Application Priority Data
Dec. 1, 2017    (JP) .................................. 2017-243206

(51) Int. Cl.
*H04W 72/21* (2023.01)
*H04B 1/713* (2011.01)
*H04L 1/1812* (2023.01)

(52) U.S. Cl.
CPC ............ *H04W 72/21* (2023.01); *H04B 1/713* (2013.01); *H04L 1/1812* (2013.01)

(58) Field of Classification Search
CPC .. H04W 72/0413; H04W 72/04; H04B 1/713; H04L 1/1812; H04L 5/0012; H04L 5/0057; H04L 5/0055
See application file for complete search history.

(56) References Cited

U.S. PATENT DOCUMENTS 10,530,528 B2 *  1/2020  Park ...................... H04L 1/0067
2013/0039321 A1 *  2/2013  Kim .......................... H04L 5/00
                                                              370/329
(Continued)

FOREIGN PATENT DOCUMENTS

WO    2016/119251 A1    8/2016

OTHER PUBLICATIONS

Samsung, "On UCI Multiplexing in PUSCH", 3GPP TSG RAN WG1 Ad-Hoc Meeting, R1-1700948, Jan. 2017, 5 pages. (Year: 2017).*

(Continued)

*Primary Examiner* — Ayaz R Sheikh
*Assistant Examiner* — Tarell A Hampton
(74) *Attorney, Agent, or Firm* — Osha Bergman Watanabe & Burton LLP

(57) ABSTRACT

A user terminal according to one aspect of the present disclosure includes a transmitting section that transmits data and uplink control information using an uplink shared channel, and a control section that controls a mapping pattern of the uplink control information, based on whether or not a frequency resource to which the uplink shared channel is allocated is hopped in a slot.

5 Claims, 10 Drawing Sheets

(56) References Cited

U.S. PATENT DOCUMENTS

| | | | | |
|---|---|---|---|---|
| 2016/0021653 | A1* | 1/2016 | Papasakellariou | H04L 5/0057 370/329 |
| 2018/0013522 | A1* | 1/2018 | Liu | H04L 5/0055 |
| 2018/0069652 | A1* | 3/2018 | Yamamoto | H04L 1/0009 |
| 2018/0110041 | A1* | 4/2018 | Bendlin | H04B 1/7143 |
| 2018/0206225 | A1* | 7/2018 | Li | H04L 5/0053 |
| 2019/0165896 | A1* | 5/2019 | Huang | H04B 7/0626 |
| 2020/0052835 | A1* | 2/2020 | Xiong | H04L 1/1819 |

OTHER PUBLICATIONS

LG Electronics, "Multiplexing of UL channels and signals in NR", 3GPP TSG RAN WG1 NR-AdHoc Meeting, R1-1700506, Jan. 2017, 7 pages. (Year: 2017).*
Extended European Search Report issued in counterpart European Patent Application No. 18884540.8, dated Jul. 14, 2021 (8 pages).
NTT Docomo, Inc.; "UCI multiplexing"; 3GPP TSG RAN WG1 Meeting 90bis, R1-1718213; Prague, CZ; Oct. 9-13, 2017 (8 pages).
Huawei, HiSilicon; "On UCI multiplexing"; 3GPP TSG RAN WG1 Meeting #91, R1-1719397; Reno, USA; Nov. 27-Dec. 1, 2017 (9 pages).
Intel Corporation; "UCI multiplexing on PUSCH"; 3GPP TSG RAN WG1 Meeting 91, R1-1720091; Reno, USA Nov. 27-Dec. 1, 2017 (5 pages).
CATT; "Multiplexing of UCI and UL data on PUSCH"; 3GPP TSG RAN WG1 Meeting #91, R1-1720200; Reno, USA Nov. 27-Dec. 1, 2017 (4 pages).
International Search Report issued in Application No. PCT/JP2018/044207, dated Feb. 19, 2019 (3 pages).
Written Opinion issued in International Application No. PCT/JP2018/044207, dated Feb. 19, 2019 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting 91; R1-1720685; "Multiplexing of PUCCH and PUSCH;" Qualcomm Incorporated; Nov. 27-Dec. 1, 2017; Reno, USA (11 pages).
3GPP TSG RAN WG1 Meeting 91; R1-1719927; "UCI on PUSCH and UL channel multiplexing for NR;" LG Electronics; Nov. 27-Dec. 1, 2017; Reno, USA (19 pages).
Office Action issued in Chile Application No. 202001425 dated Sep. 15, 2021 (20 pages).
Samsung, "Performance Results for UCI and Data Multiplexing", 3GPP TSG RAN WG1 Meeting 90bis, R1-1720336, Reno, USA, Nov. 27-Dec. 1, 2017 (4 pages).
Office Action issued in Chilean Application No. 202001425 dated Jun. 6, 2022 (26 pages).
Office Action issued in Indian Application No. 202037027281 dated Jun. 8, 2022 (7 pages).

* cited by examiner

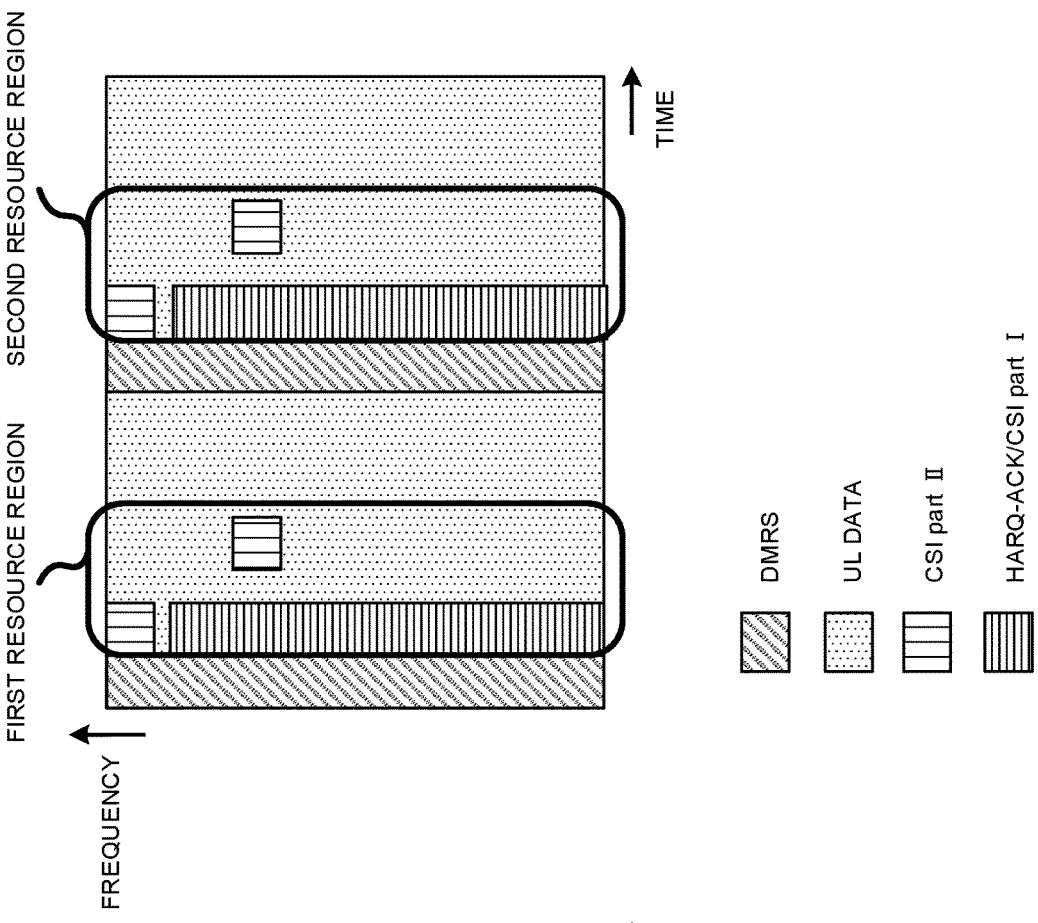
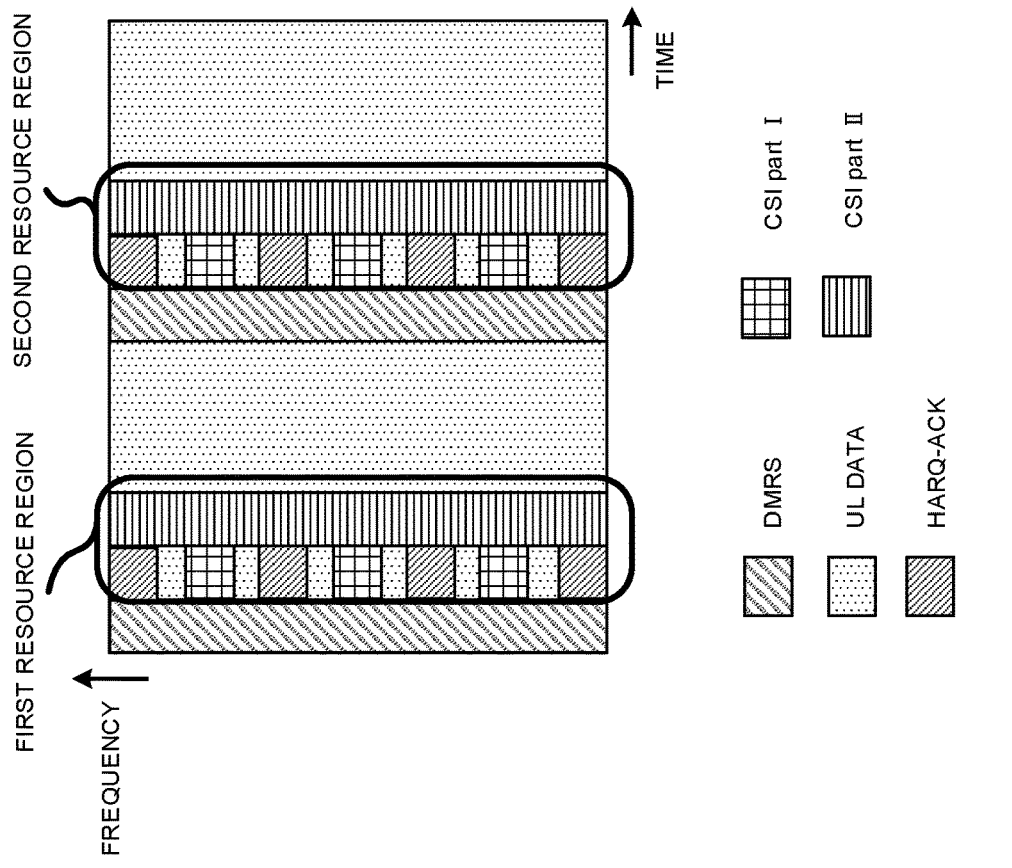

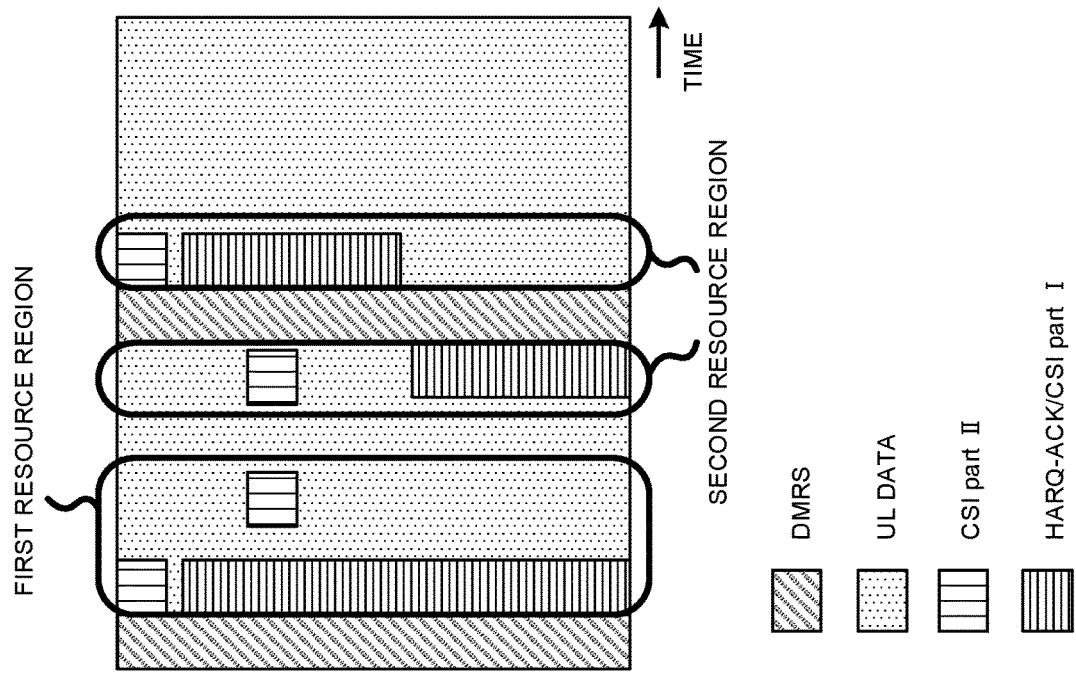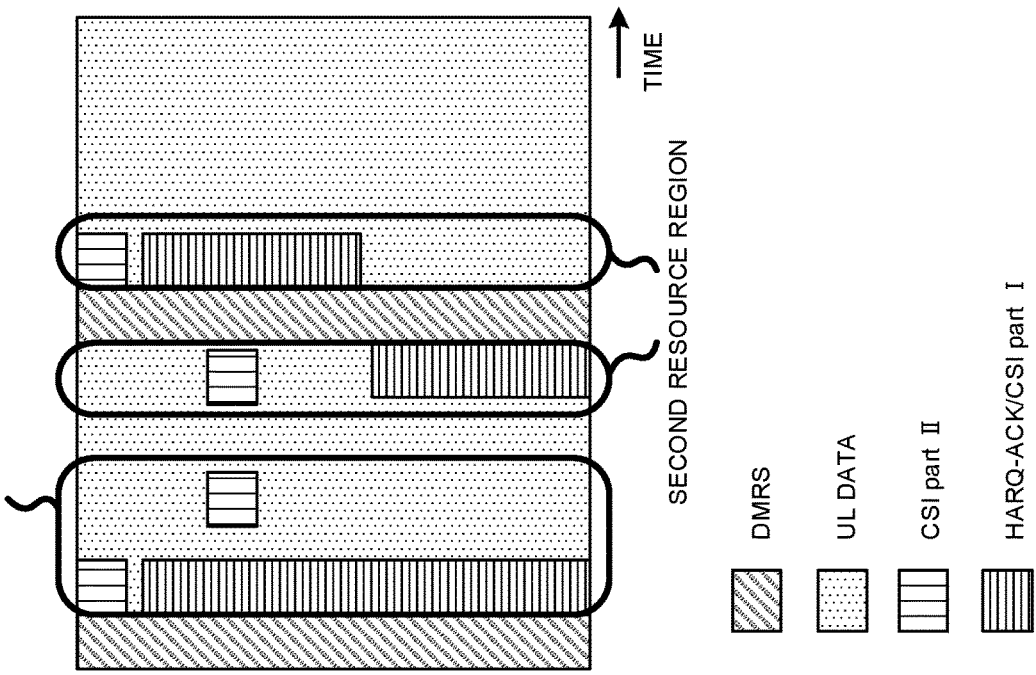
FIG. 4B
FIG. 4A

USER TERMINAL AND RADIO COMMUNICATION METHOD

TECHNICAL FIELD

The present disclosure relates to a user terminal and a radio communication method in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency, and so on (see Non-Patent Literature 1). For the purpose of further high capacity, advancement, and so on of LTE (LTE Rel. 8, Rel. 9), the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a user terminal (UE (User Equipment)) transmits uplink control information (UCI) by use of a UL data channel (for example, PUSCH (Physical Uplink Shared Channel)) and/or a UL control channel (for example, PUCCH (Physical Uplink Control Channel)).

In a case that an uplink data (UL data) transmission timing and an uplink control information (UCI) transmission timing overlap, the UE may use an uplink shared channel (PUSCH) to transmit uplink data and UCI. Transmission of the UCI by use of the PUSCH is also referred to as "UCI on PUSCH" ("piggyback on PUSCH"), "UCI piggyback," "PUSCH piggyback," and the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, a study is underway to map a demodulation reference signal (DMRS) for a PUSCH to one or more symbols in a slot. For example, in a case that a frequency resource for a PUSCH is hopped in a slot in which the PUSCH is scheduled (intra-slot frequency hopping (FH)), it is assumed that a symbol for a DMRS (DMRS symbol) is allocated for each frequency resource to be hopped.

However, in a case that a plurality of DMRS symbols (for example, an initial DMRS symbol and an additional DMRS symbol) are allocated in the slot, how to map UCI is an issue. For example, in a case that the UCI is mapped using the same pattern as a case that one DMRS symbol is allocated in the slot, a performance improvement effect owing to the additional DMRS symbol may not be properly given to the UCI, which may possibly deteriorate characteristics of the UCI.

In view of this, the present disclosure has an object to provide a user terminal and a radio communication method that can prevent characteristics of uplink control information from deteriorating in a case of piggybacking the uplink control information on an uplink data channel.

Solution to Problem

A user terminal according to one aspect of the present disclosure includes a transmitting section that transmits data and uplink control information using an uplink shared channel, and a control section that controls a mapping pattern of the uplink control information, based on whether or not a frequency resource to which the uplink shared channel is allocated is hopped in a slot.

Advantageous Effects of Invention

According to one aspect of the present disclosure, characteristics of uplink control information can be prevented from deteriorating in a case of piggybacking the uplink control information on an uplink data channel.

BRIEF DESCRIPTION OF DRAWINGS

FIGS. 3A and 3B are diagrams to show other examples of the mapping of UCI according to the present embodiment UCI;

FIGS. 4A and 4B are diagrams to show further other examples of the mapping of UCI according to the present embodiment;

DESCRIPTION OF EMBODIMENTS

Figure 1A:
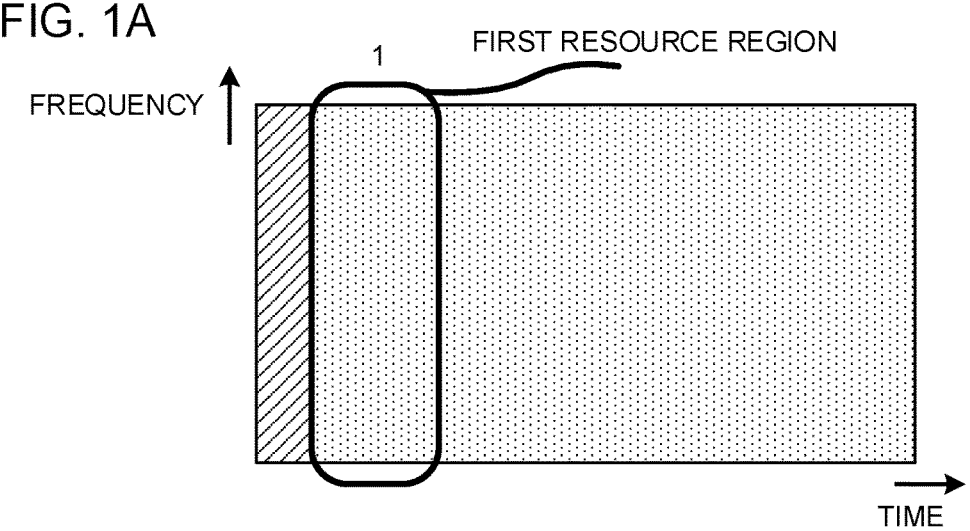
FIGS. 1A to 1C are diagrams to show examples of a mapping pattern of UCI according to the present embodiment.

Examples of a method of achieving a low PAPR (Peak-to-Average Power Patio) and/or low inter-modulation distribution (IMD) in UL communication includes a method of multiplexing and transmitting (piggybacking) UCI and UL data on a PUSCH in a case that UCI transmission and UL data (UL-SCH) transmission occur at the same timing.

In existing LTE systems, in a case that the PUSCH is used to transmit the UL data and the UCI (for example, an A/N), a puncture process is performed on the UL data to multiplex the UCI on a resource subjected to the puncture process. This is because a volume (or a ratio) of the UCI multiplexed on the PUSCH is not so large in the existing LTE systems, and/or is for suppressing complexity of a reception process in a base station even in a case that a DL signal detection error occurs in a UE.

The puncture process being performed on data is to perform coding assuming that the resource allocated for the data can be utilized (or without consideration of the amount of unavailable resources), while not mapping a coded symbol to an actually unavailable resource (for example, resource for UCI) (clearing the resource). On a receiving side, characteristics deterioration due to the puncturing can be suppressed by not using the coded symbol of the punctured resource in decoding.

In NR, a study is underway also to apply a rate-matching process to UL data in a case that a PUSCH is used to transmit the UL data and UCI.

The rate-matching process being performed on data is to control the number of bits after coding (coded bits) in consideration of actually available radio resources. In a case that the number of coded bits is smaller than the number of bits mappable to the actually available radio resources, at least some of the coded bits may be repeated. In a case that the number of coded bits is larger than the number of mappable bits, some of the coded bits may be deleted.

The rate-matching process on the UL data in consideration of an actually available radio resource allows coding at a higher coding rate (with high performance) than that of a case with the puncture process. Therefore, for example, adopting the rate-matching process in place of the puncture process in a case of a large payload size of UCI allows UL signals to be generated with a higher quality, which can improve a communication quality.

As described above, in NR, in a case that the PUSCH is used to transmit the UL data and the UCI, the puncture and/or rate-matching process is applied to the UL data to map the UCI to a radio resource (for example, a resource element (RE), a resource block (RB), or a resource block group (RBG)) in a certain pattern (mapping pattern).

Here, in NR, a study is underway to map a demodulation reference signal (DMRS) for a PUSCH in one or more symbols in a slot. For example, in a case that intra-slot frequency hopping (FH) is applied to the PUSCH, it is assumed that one or more symbols for DMRS (DMRS symbols) are allocated per frequency resource to be hopped.

Here, the intra-slot frequency hopping is to hop a frequency resource for a PUSCH in a slot in which the PUSCH is scheduled. For example, in the intra-slot frequency hopping, the frequency resource for the PUSCH is hopped in the slot in a certain rule (for example, at a certain frequency offset and/or a certain timing (a hopping boundary)).

However, in a case that a plurality of DMRS symbols (for example, an initial DMRS symbol and an additional DMRS symbol) are allocated in the slot, how to map UCI is an issue. For example, in a case that the UCI is mapped using the same pattern as a case that one DMRS symbol is allocated in the slot, a performance improvement effect owing to the additional DMRS symbol may not be properly given to the UCI, which may possibly deteriorate characteristics of the UCI. Moreover, a frequency diversity effect owing to the intra-slot frequency hopping may not be properly given to the UCI, which may possibly deteriorate the characteristics of the UCI.

In view of this, the inventors of the present invention focused on that characteristics of UCI can be improved as a result of a performance improvement effect owing to an additional DMRS symbol (and/or the frequency diversity effect owing to the intra-slot frequency hopping) by controlling the mapping pattern of the UCI, based on whether or not a plurality of DMRS symbols are allocated in a slot (and/or whether or not the intra-slot frequency hopping is applied to a PUSCH), and came up with the present invention.

Hereinafter, an embodiment according to the present disclosure will be described in detail. Note that the UCI may include at least one of a scheduling request (SR), acknowledgment information for a DL data channel (for example, PDSCH (Physical Downlink Shared Channel)) (also referred to as an "HARQ-ACK (Hybrid Automatic Repeat reQuest-Acknowledge)," "ACK" or "NACK (Negative ACK)," or "A/N," and the like), channel state information (CSI) including a CQI (Channel Quality Indicator) and rank information (RI (Rank Indicator), beam index information (BI), and a buffer status report (BSR).

In the present embodiment, a user terminal uses a PUSCH to transmit data and UCI. The user terminal may control a mapping pattern for the PUSCH, based on whether or not a frequency resource allocated to the PUSCH in a slot is hopped (whether or not the intra-slot frequency hopping is applied).

Note that in the present embodiment, "whether or not the intra-slot frequency hopping is applied" may be interpreted as "whether or not a plurality of DMRS symbols are provided in the slot." Hereinafter, it is assumed that, if the intra-slot frequency hopping is applied, a plurality of DMRS symbols in the slot are provided, but no such limitation is imposed. Regardless of whether or not the intra-slot frequency hopping is applied, a plurality of DMRS symbols may be provided in the slot.

(Mapping Pattern)

Figure 1B:
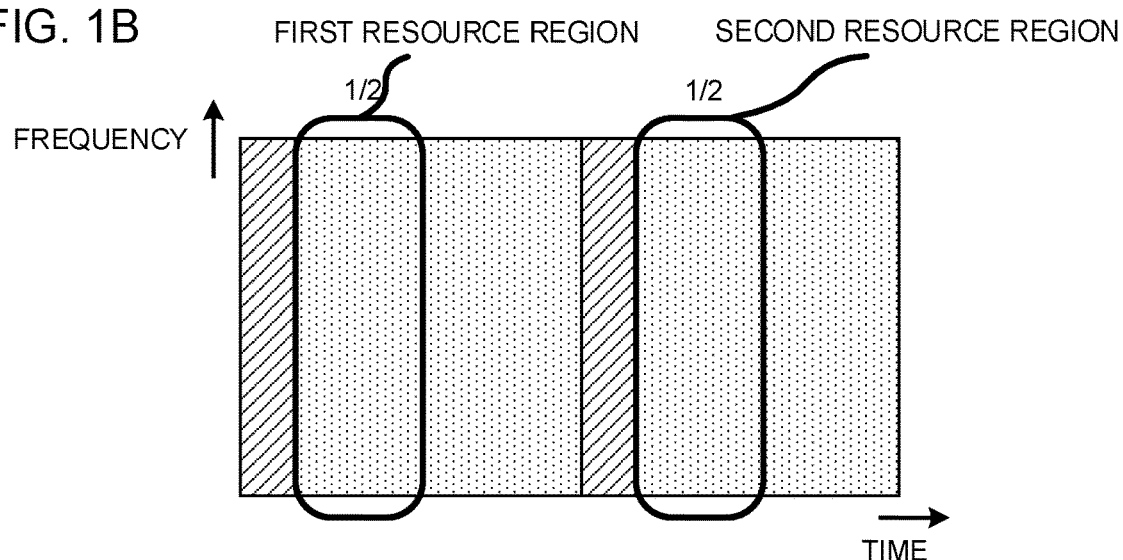
Figure 1C:
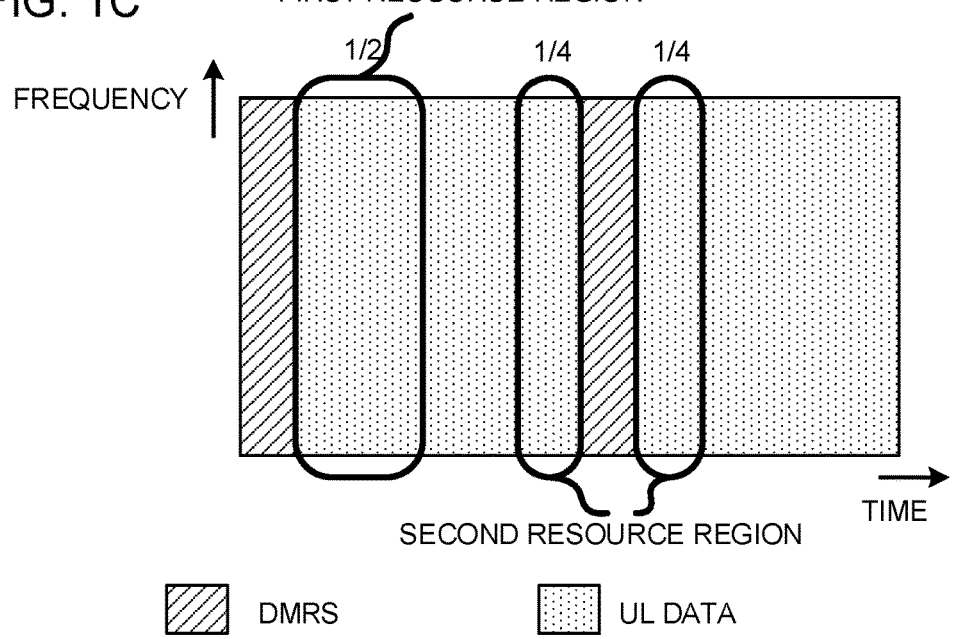

FIGS. 1A to 1C are diagrams to show examples of a mapping pattern of UCI according to the present embodiment. FIG. 1A shows the mapping pattern of the UCI if the intra-slot frequency hopping is not applied (in a case that one DMRS symbol is provided in the slot).

As shown in FIG. 1A, in a case that only an initial DMRS symbol is provided in a slot, the user terminal may map the entire UCI (100% of the UCI) to be transmitted in the slot to a first resource domain (resource region) after the initial DMRS symbol in the slot. Here, the first resource domain includes a certain number of symbols and/or a certain number of frequency resources (for example, at least one of RBs, RBGs, and REs).

FIGS. 1B and 1C show mapping patterns of the UCI in the case that the intra-slot frequency hopping is applied (in the case that a plurality of DMRS symbols are provided in a slot). Note that in FIGS. 1B and 1C, the initial DMRS symbol and one additional DMRS symbol are provided in the slot, but no such limitation is imposed, and two or more additional DMRS symbols may be provided in the slot.

As shown in FIG. 1B, if a plurality of DMRS symbols are provided in the slot, the user terminal may distribute and map the UCI to be transmitted in the slot, at an equal ratio to a plurality of resource domains after the plurality of respective. The user terminal may use the same mapping pattern among the plurality of resource domains to distribute and map the UCI to be transmitted in the slot.

For example, in FIG. 1B, the user terminal maps 50% of the UCI to be transmitted in the slot, to a first resource domain after the initial DMRS symbol, and maps 50% of the UCI to a second resource domain after the additional DMRS symbol.

Alternatively, as shown in FIG. 1C, if a plurality of DMRS symbols are provided in the slot, the user terminal may distribute and map the UCI to be transmitted in the slot, at an equal ratio to resource domains adjacent to the plurality of respective DMRS symbols. The user terminal may use mapping patterns different among the plurality of resource domains to distribute and map the UCI to be transmitted in the slot.

For example, in FIG. 1C, the user terminal maps 50% of the UCI to be transmitted in the slot to the first resource domain after the initial DMRS symbol, and maps 50% of the UCI to the second resource domain before and after the additional DMRS symbol. To be more specific, 25% of the UCI is mapped to the second resource domain before the additional DMRS symbol, and 25% of the UCI is mapped to the second resource domain after the additional DMRS symbol.

As shown in FIGS. 1B and 1C, if the intra-slot frequency hopping is applied (in the case that a plurality of DMRS symbols are provided in the slot), the UCI to be transmitted in the slot is distributed and mapped to the first resource domain and the second resource domain. For this reason, the characteristics of the UCI can be improved as a result of a performance improvement effect owing to the additional DMRS symbol (and/or the frequency diversity effect owing to the intra-slot frequency hopping).

(Detail of Mapping)

Next, a detail of the mapping of UCI will be described according to the present embodiment. Hereinafter, for example, an example of mapping of a HARQ-ACK and/or CSI is described, and the mapping described below is applicable to other pieces of UCI.

Hereinafter, the CSI may include a plurality of parts. A first part of the CSI (CSI part I) may be, for example, information having the number of bits that is relatively small such as the RI. A second part of the CSI (CSI part II) may be information defined based on CSI part I (for example, information having the number of bits that is relatively large such as the CQI).

Figure 2B:
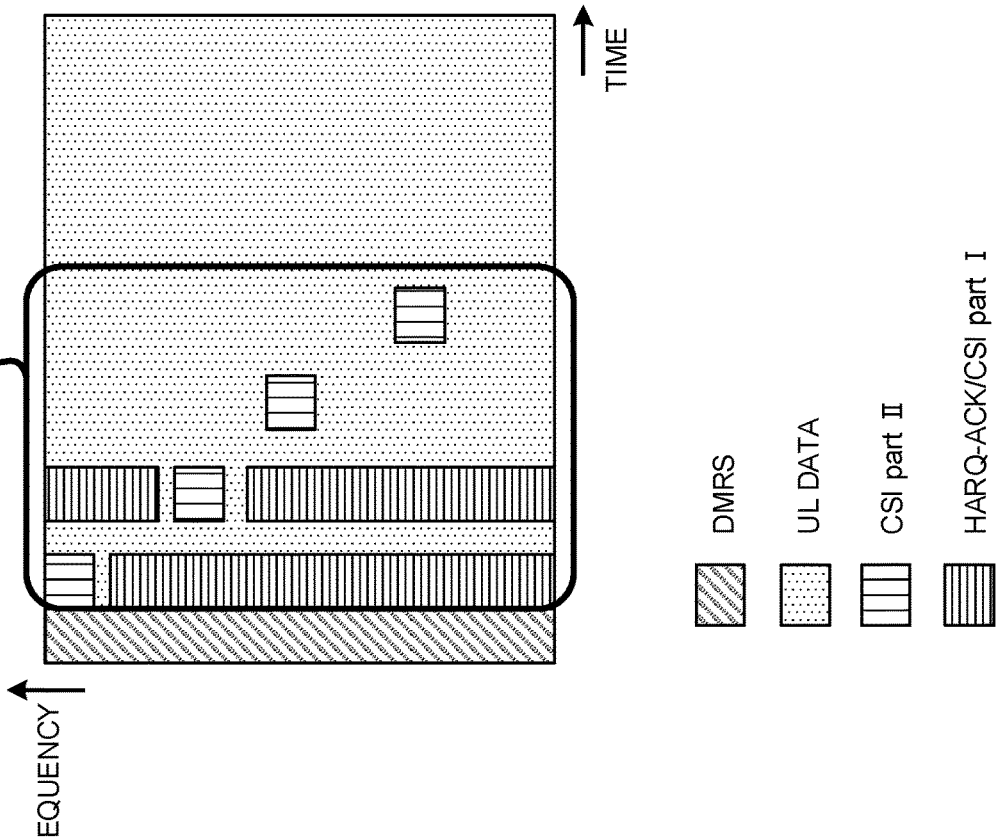
FIGS. 2A and 2B are diagrams to show examples of mapping of UCI according to the present embodiment.
Figure 2A:
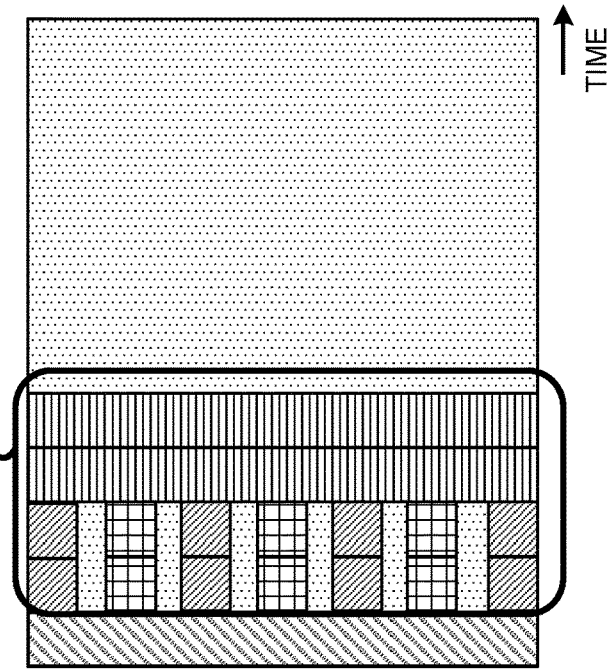

FIGS. 2A and 2B are diagrams to show examples of the mapping of UCI according to the present embodiment. FIGS. 2A and 2B show examples of mapping of the HARQ-ACK and CSI parts I and II in the case that the intra-slot frequency hopping is not applied (in the case that one DMRS symbol is provided in the slot) as described in FIG. 1A above.

Note that in FIGS. 2A and 2B, a mapping unit for each piece of UCI (here, HARQ-ACK, CSI parts I and II) may be a resource block (RB), a resource block group (RBG), or a resource element (RE). Each piece of UCI may be mapped by way of the puncture and/or rate-matching of the data.

As shown in FIG. 2A, the HARQ-ACK and/or CSI part I may be mapped to positions closer to the DMRS symbol than CSI part II is. For example, in FIG. 2A, the HARQ-ACK and CSI part I are frequency-division-multiplexed in the same symbol subsequent to the DMRS symbol. On the other hand, CSI part II is time-division-multiplexed with the HARQ-ACK and CSI part I.

However, as shown in FIG. 2B, the HARQ-ACK and CSI part I may be grouped while being mapped to be mapped separately from CSI part II. In FIG. 2B, the HARQ-ACK and CSI part I may be distributed into a plurality of symbols that are subsequent to the DMRS symbol. Note that the HARQ-ACK and CSI part I may divided into and mapped to subparts #1 and #2.

FIGS. 3A and 3B are diagrams to show other examples of the mapping of UCI according to the present embodiment UCI. FIGS. 3A and 3B show examples of mapping of the HARQ-ACK and CSI parts I and II in the case that the intra-slot frequency hopping is applied (in the case that a plurality of DMRS symbols are provided in the slot) as described in FIG. 1B. In FIGS. 3A and 3B, differences from FIGS. 2A and 2B are mainly described.

As shown in FIGS. 3A and 3B, if a plurality of DMRS symbols are provided in the slot, the user terminal may distribute and map the UCI to be transmitted in the slot, at an equal ratio to resource domains after the plurality of respective DMRS symbols (for example, 50% to the first resource domain and 50% to the second resource domain). For example, in FIGS. 3A and 3B, the HARQ-ACK and CSI parts I and II to be transmitted in the slot are mapped at an equal ratio to the first resource domain after the initial DMRS symbol and the second resource domain after the additional DMRS symbol.

Note that in FIGS. 3A and 3B, the HARQ-ACK and CSI parts I and II are mapped at an equal ratio, but no such limitation is imposed. For example, so long as the ratio of all the pieces of UCI to be transmitted in the slot is substantially equal, the UCI may be mapped differently to the first and second resource domains (for example, the HARQ-ACK and CSI part I may be mapped to the first resource domain, and CSI part II may be mapped to the second resource domain).

In FIGS. 3A and 3B, the same mapping pattern is applied to each piece of UCI in the first resource domain and the second resource domain, but a different mapping pattern may be applicable to at least one piece of UCI in the first resource domain and the second resource domain.

FIGS. 4A and 4B are diagrams to show further other examples of the mapping of UCI according to the present embodiment. FIGS. 4A and 4B show examples of the mapping of the HARQ-ACK and CSI parts I and II in the case that the intra-slot frequency hopping is applied (in the case that a plurality of DMRS symbols are provided in the slot) as described in FIG. 1C. In FIGS. 4A and 4B, differences from FIGS. 3A and 3B are mainly described.

As shown in FIGS. 4A and 4B, if a plurality of DMRS symbols are provided in the slot, the user terminal may distribute and map the UCI to be transmitted in the slot, at a substantially equal ratio to the first resource domain after the initial DMRS symbol, and the second resource domain before and after the additional DMRS symbol.

For example, in FIGS. 4A and 4B, different mapping patterns are used for the first resource domain after the initial DMRS symbol and the second resource domain adjacent to the additional DMRS symbol. In FIGS. 4A and 4B, the HARQ-ACK and CSI parts I and II are mapped to the second resource domain before and after the additional DMRS symbol at a substantially equal ratio (for example, 25% before the additional DMRS symbol, and 25% after the additional DMRS symbol), but no such limitation is imposed. The ratio of the UCI for before and after the additional DMRS symbol may not be equal.

In FIGS. 4A and 4B, one or some pieces of the UCI (for example, the HARQ-ACK) may be mapped after the additional DMRS symbol, and the other piece(s) of the UCI (for example, CSI part I) may be mapped before the additional DMRS symbol.

According to the embodiment described above, the characteristics of the UCI can be improved as a result of the performance improvement effect owing to the additional DMRS symbol (and/or the frequency diversity effect owing to the intra-slot frequency hopping) in the case that the PUSCH is used to transmit the UCI.

(Radio Communication System)

Hereinafter, a structure of a radio communication system according to the present embodiment will be described. In this radio communication system, at least one combination of the above plurality of aspects is used to perform communication.

Figure 5:
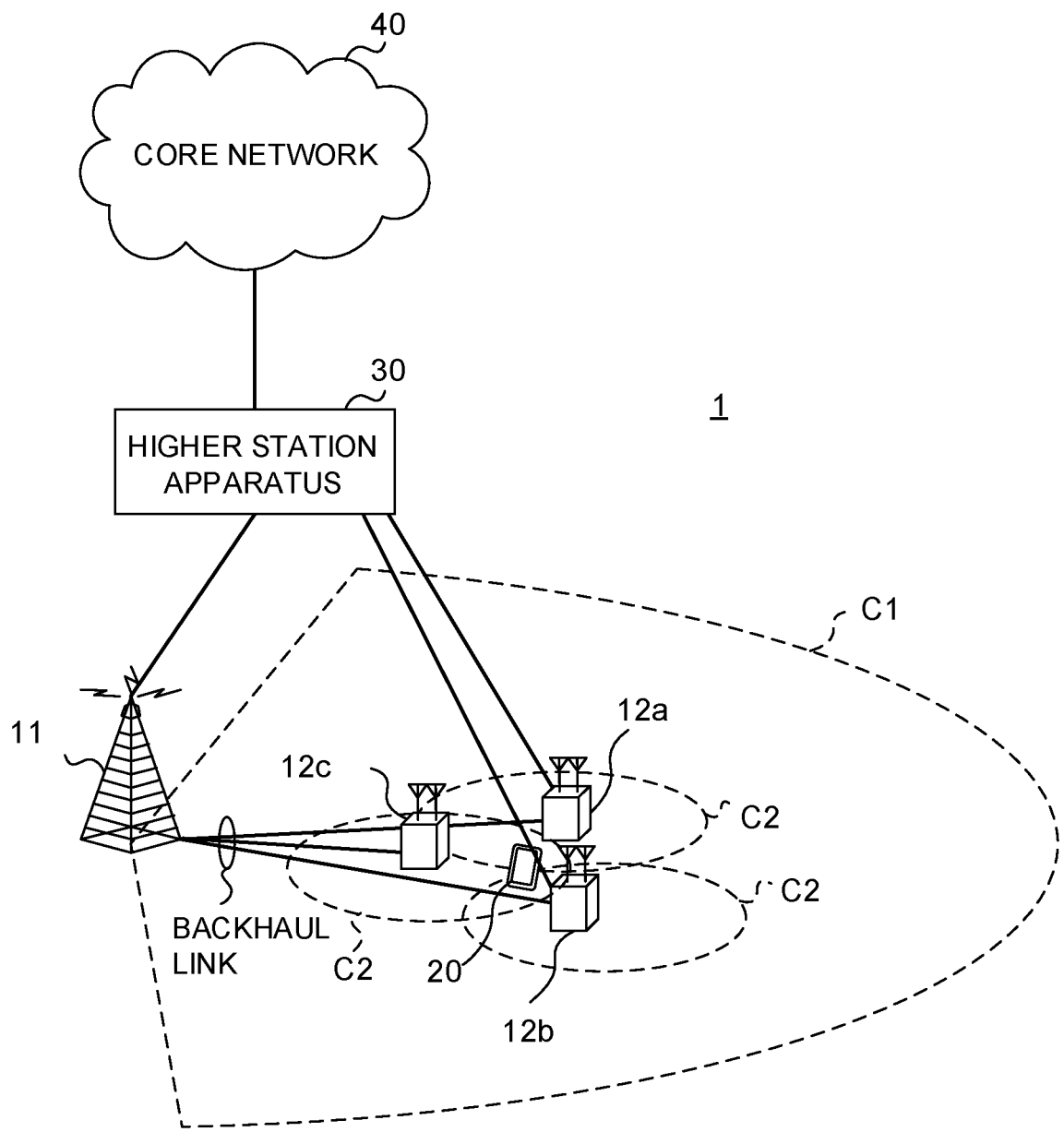
FIG. 5 is a diagram to show an example of a schematic structure of a radio communication system according to the present embodiment.

FIG. 5 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. Also, the user terminal 20 may adopt the CA or the DC by using a plurality of cells (CCs) (for example, five or less CCs, six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of the downlink control channels (PDCCH (Physical Downlink Control Channel) and/or EPDCCH (Enhanced Physical Downlink Control Channel), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. Downlink radio link quality information (CQI (Channel Quality Indicator)), acknowledgement information, a scheduling request (SR), and so on are communicated on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

In the radio communication system 1, the synchronization signal (for example, PSS (Primary Synchronization Signal)/SSS (Secondary Synchronization Signal)), a broadcast channel (PBCH (Physical Broadcast Channel)) and the like are communicated. Note that the synchronization signal and the PBCH may be transmitted in a synchronization signal block (SSB).

(Radio Base Station)

Figure 6:
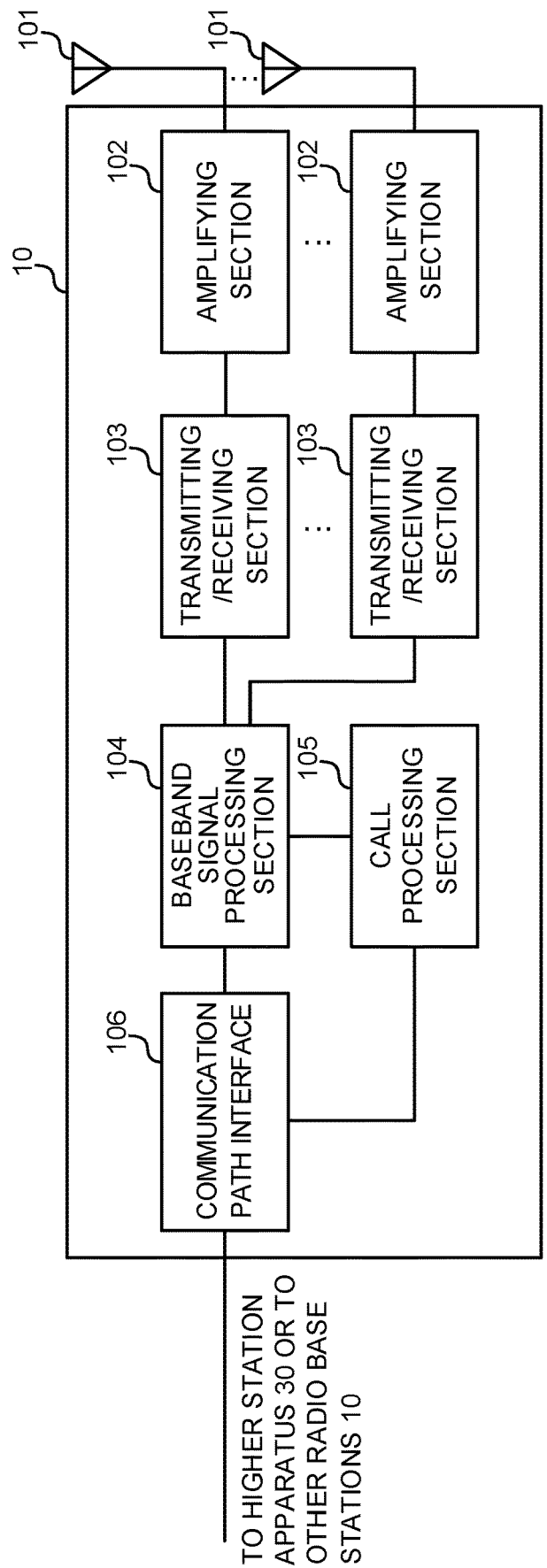
FIG. 6 is a diagram to show an example of an overall structure of a radio base station according to the present embodiment.

FIG. 6 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may transmit the UL grant. The transmitting/receiving sections 103 may receive the UCI.

Figure 7:
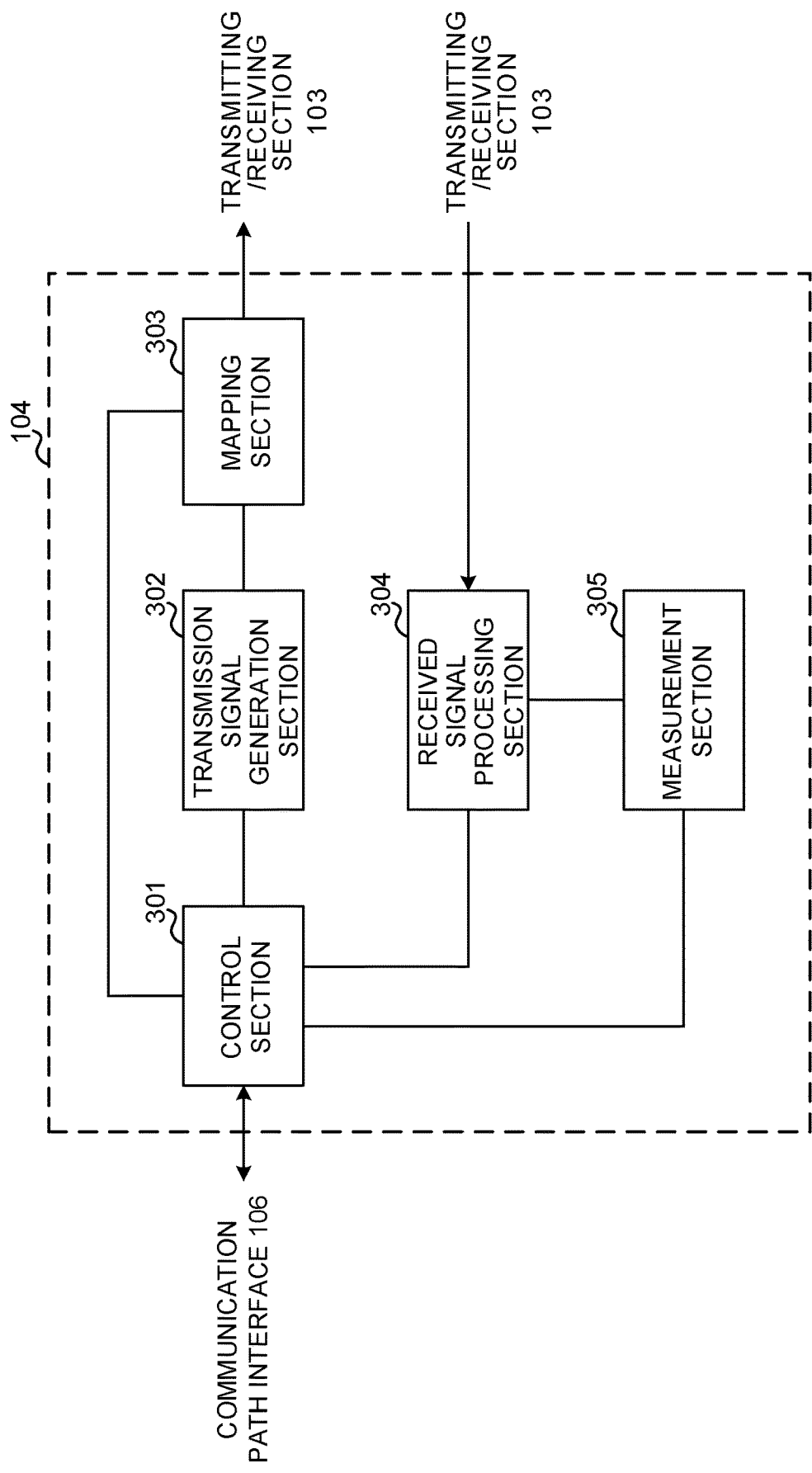
FIG. 7 is a diagram to show an example of a functional structure of the radio base station according to the present embodiment.

FIG. 7 is a diagram to show an example of a functional structure of the radio base station according to the present embodiment. Note that, the present example primarily shows functional blocks that pertain to characteristic parts of the present embodiment, and it may be assumed that the radio base station 10 includes other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource allocation) of system information, a downlink data signal (for example, a signal transmitted on the PDSCH), a downlink control signal (for example, a signal transmitted on the PDCCH and/or the EPDCCH, acknowledgment information and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS/SSS), a downlink reference signal (for example, CRS, CSI-RS, DMRS), and so on.

The control section 301 may control applying a depuncture process and/or a rate-dematching process to the received uplink shared channel (for example, the PUSCH) or the uplink data.

The control section 301 controls the receiving process on the UCI using the uplink shared channel (for example, the PUSCH) (for example, at least one or demapping, demodulation, and decoding).

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and the like are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 8:
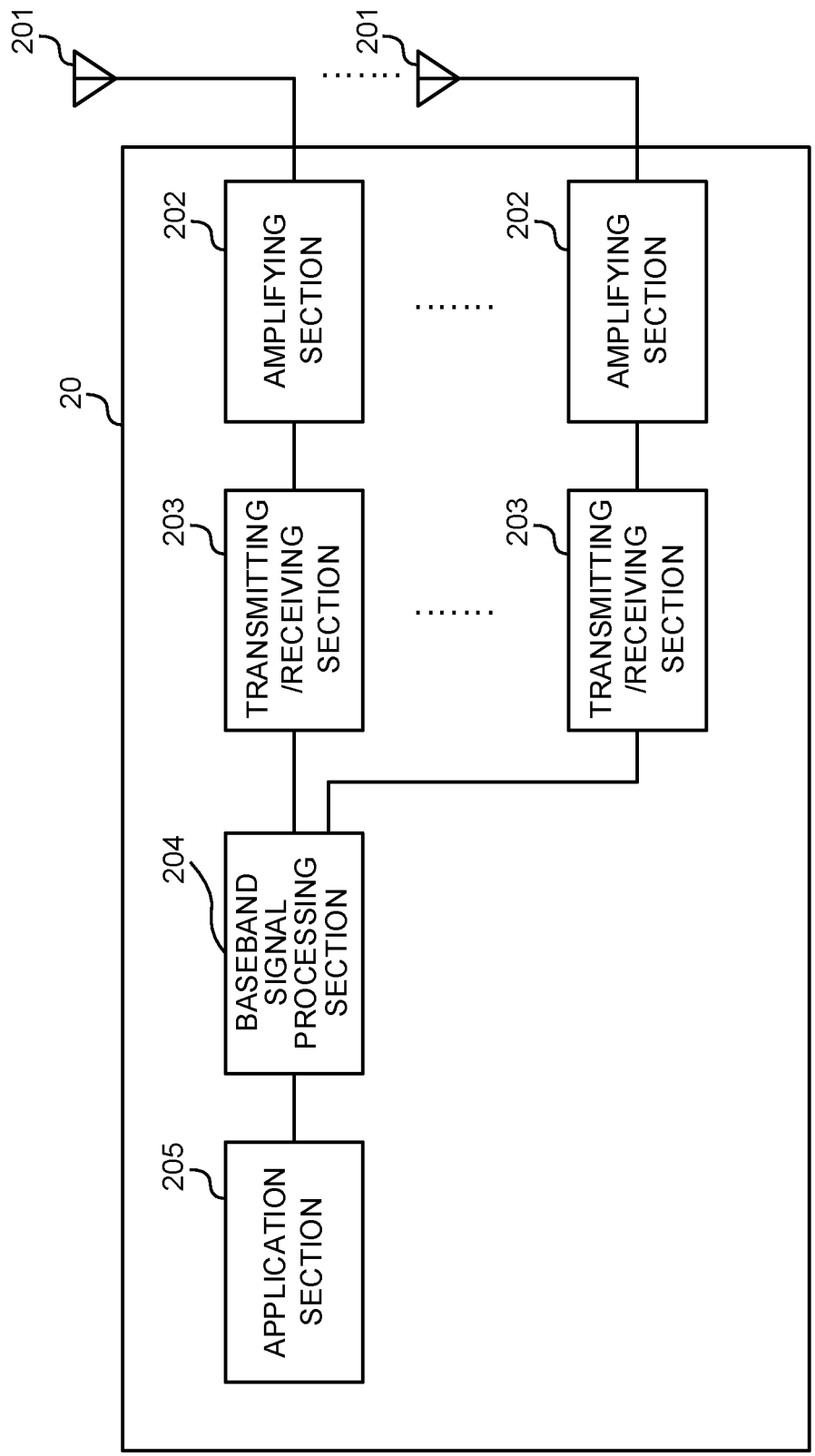
FIG. 8 is a diagram to show an example of an overall structure of a user terminal according to the present embodiment.

FIG. 8 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may receive the UL grant. The transmitting/receiving sections 203 may transmit the UCI.

Figure 9:
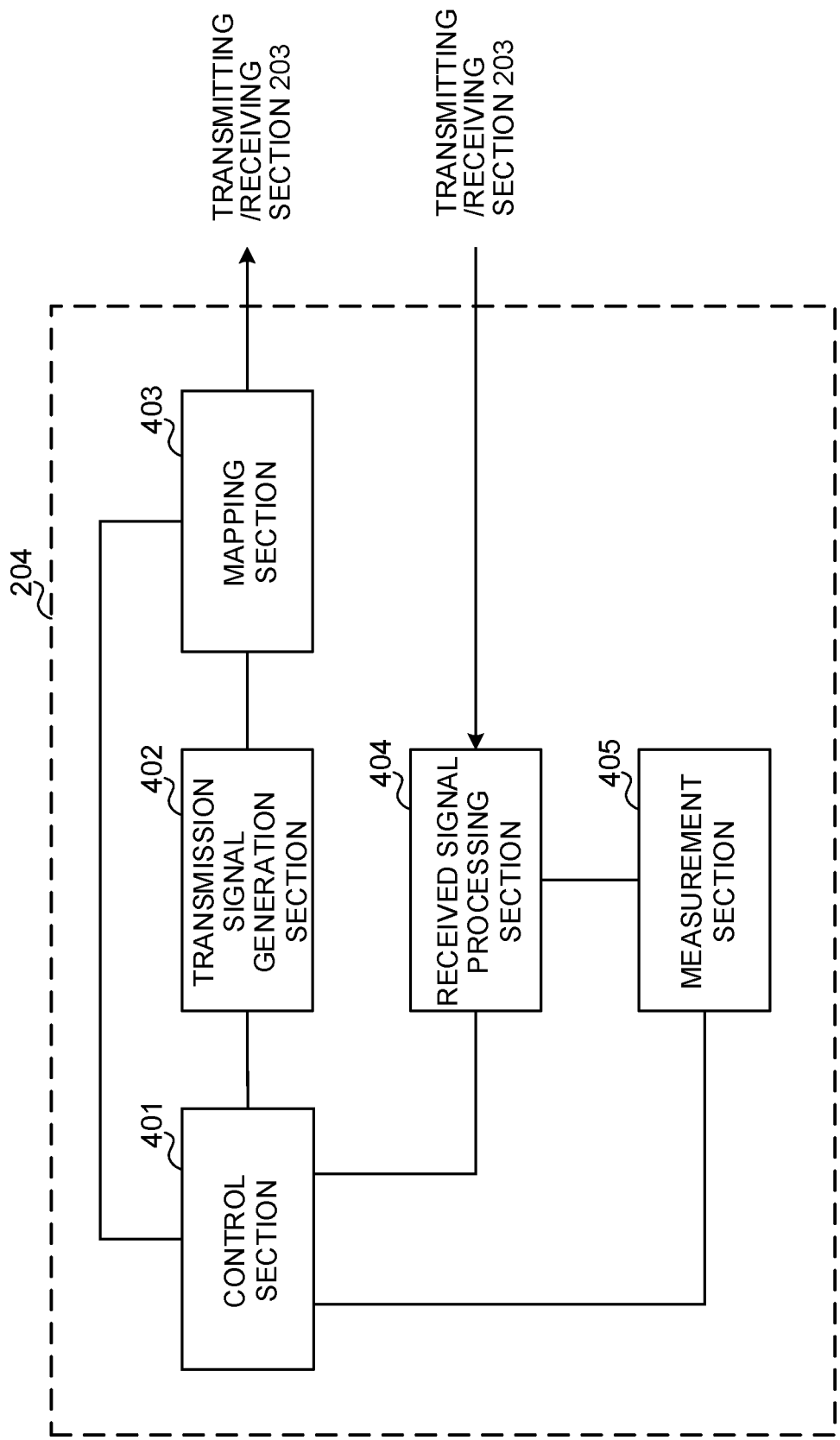
FIG. 9 is a diagram to show an example of a functional structure of the user terminal according to the present embodiment.

FIG. 9 is a diagram to show an example of a functional structure of the user terminal according to the present embodiment. Note that, this example primarily shows functional blocks that pertain to characteristic parts of the present embodiment, and it may be assumed that the user terminal 20 includes other functional blocks that are necessary for radio communication.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 uses the uplink shared channel to control transmission of the data and the uplink control information.

The control section 401 may control a mapping pattern of the uplink control information, based on whether or not a frequency resource allocated to the uplink shared channel in a slot is hopped (or, whether or not a plurality of DMRS symbols are allocated in a slot).

Specifically, if the frequency resource is hopped in the slot (or, if a plurality of DMRS symbols are allocated in the slot), the control section 401 may control mapping of the uplink control information in the first resource domain after an initial symbol for the demodulation reference signal and the second resource domain after the additional symbol for the demodulation reference signal (in FIGS. 1B, 2B, 3B, and 4B).

If the frequency resource is hopped in the slot (or, if a plurality of DMRS symbols are allocated in the slot), the control section 401 may control mapping of the uplink control information in the first resource domain after an initial symbol for the demodulation reference signal and the second resource domain before and after the additional symbol for the demodulation reference signal (in FIGS. 1C, 2C, 3C, and 4C).

If the frequency resource is not hopped in the slot (or, if one DMRS symbol is allocated in the slot), the control section 401 may control mapping of the uplink control information in the first resource domain after an initial symbol for the demodulation reference signal on the uplink shared channel (in FIGS. 1A, 2A, 3A, and 4A).

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can include a mapper, a mapping circuit or mapping apparatus that can be described based on general understanding of the technical field to which the present disclosure pertains.

The received signal processing section 404 performs receiving processes (for example, demapping, demodulation, decoding and so on) on received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 10:
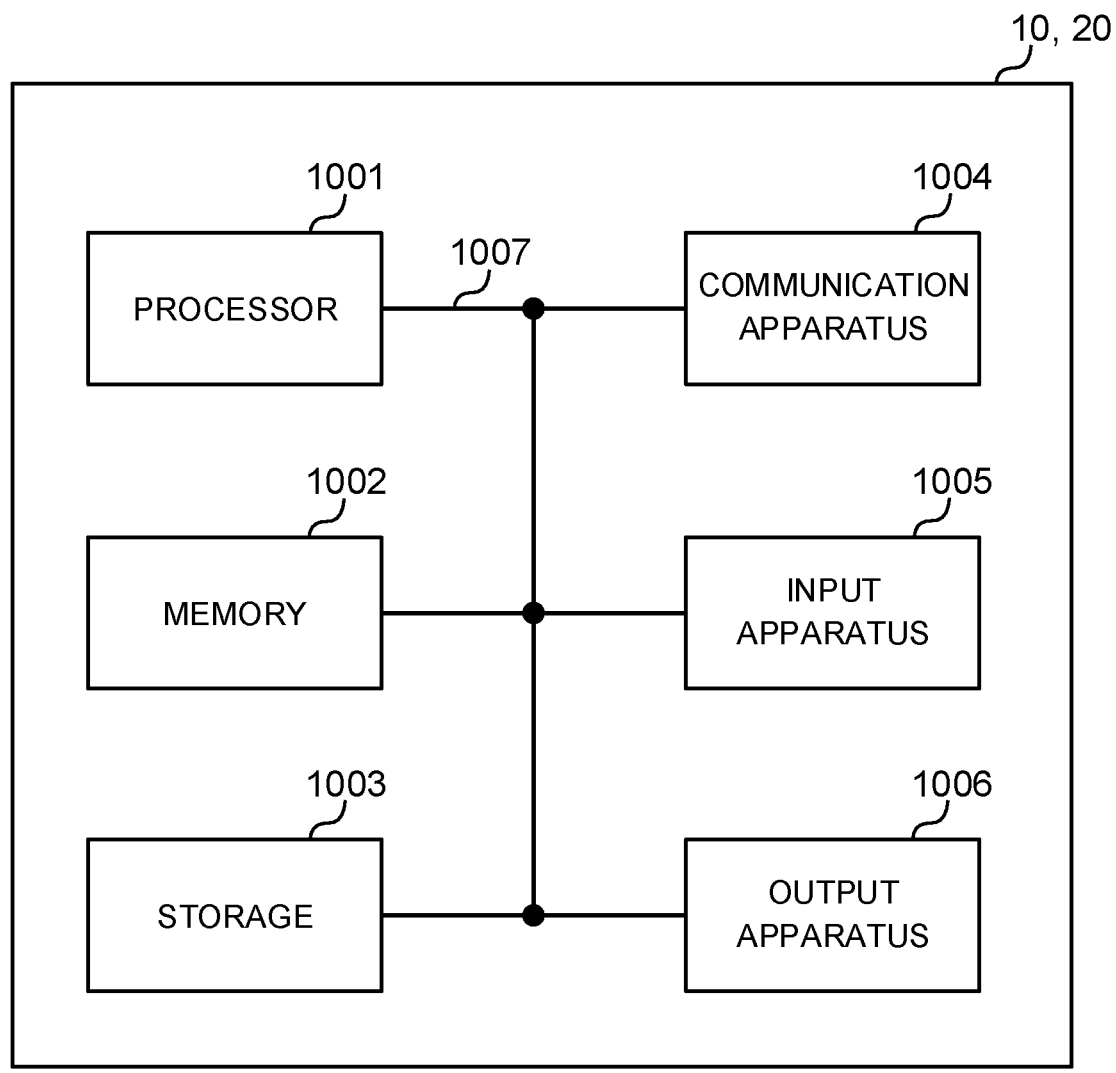
FIG. 10 is a diagram to show an example of a hardware structure of the radio base station and the user terminal according to the present embodiment.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency domains, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

(Supplementary Note)

Hereinafter, supplementary notes of the present disclosure are added.

[Structure 1]

A user terminal including a transmitting section that uses an uplink shared channel to transmit data and uplink control information, and a control section that controls a mapping pattern of the uplink control information, based on whether or not a frequency resource allocated to the uplink shared channel is hopped in a slot.

[Structure 2]

The user terminal according to Structure 1, wherein in a case that the frequency resource is hopped in the slot, the control section controls mapping of the uplink control information in a first resource domain after an initial symbol for the demodulation reference signal and a second resource domain after an additional symbol for the demodulation reference signal.

[Structure 3]

The user terminal according to Structure 1, wherein in a case that the frequency resource is hopped in the slot, the control section controls mapping of the uplink control information in a first resource domain after an initial symbol for the demodulation reference signal and a second resource domain before and after an additional symbol for the demodulation reference signal.

[Structure 4]

The user terminal according to Structure 1, wherein in a case that the frequency resource is not hopped in the slot, the control section controls mapping of the uplink control information in a first resource domain after an initial symbol for a demodulation reference signal on the uplink shared channel.

[Structure 5]

A radio communication method includes using an uplink shared channel to transmit data and uplink control information, and controlling a mapping pattern of the uplink control information, based on whether or not a frequency resource allocated to the uplink shared channel is hopped in a slot.

The present application is based on Japanese Patent Application No. 2017-243206 filed on Dec. 1, 2017. The entire contents of the application are incorporated herein by reference.

What is claimed is:

1. A terminal comprising:
a processor that, when transmitting uplink control information, UL data and demodulation reference signal by using an uplink shared channel to which frequency hopping using a plurality of resource regions comprising a first resource region and a second resource region in a single slot is applied, determines a position to multiplex the uplink control information per resource region, wherein each of the first resource region and the second resource region in the single slot supports a mapping of two or more symbols of the demodulation reference signal; and
a transmitter that transmits the uplink control information by distributing and mapping, based on the position, the uplink control information to the plurality of resource regions at a substantially equal ratio.

2. The terminal according to claim 1, when the uplink control information includes HARQ-ACK, channel state information part 1 and channel state information part 2, the processor maps each of the HARQ-ACK, the channel state information part 1 and the channel state information part 2 to the first resource region and the second resource region at the substantially equal ratio.

3. A radio communication method for a terminal, comprising:
when transmitting uplink control information, UL data and demodulation reference signal by using an uplink shared channel to which frequency hopping using a plurality of resource regions comprising a first resource region and a second resource region in a single slot is applied, determining a position to multiplex the uplink control information per resource region, wherein each of the first resource region and the second resource region in the single slot supports a mapping of two or more symbols of the demodulation reference signal; and
transmitting the uplink control information by distributing and mapping, based on the position, the uplink control information to the plurality of resource regions at a substantially equal ratio.

4. A base station comprising:
a processor that, when uplink control information, UL data and demodulation reference signal are transmitted by using an uplink shared channel to which frequency hopping using a plurality of resource regions comprising a first resource region and a second resource region in a single slot is applied, determines a position to multiplex the uplink control information per resource region, wherein each of the first resource region and the second resource region in the single slot supports a mapping of two or more symbols of the demodulation reference signal; and
a receiver that receives the uplink control information that is transmitted by being distributed and mapped, based on the position, to the plurality of resource regions at a substantially equal ratio.

5. A system comprising a terminal and a base station, the terminal comprises:
a processor that, when transmitting uplink control information, UL data and demodulation reference signal by using an uplink shared channel to which frequency hopping using a plurality of resource regions comprising a first resource region and a second resource region in a single slot is applied, determines, a position to multiplex the uplink control information per resource region, wherein each of the first resource region and the second resource region in the single slot supports a mapping of two or more symbols of the demodulation reference signal; and
a transmitter that transmits the uplink control information by distributing and mapping based on the position, the uplink control information to the plurality of resource regions at a substantially equal ratio; and
the base station comprises:
a processor that determines the position; and
a receiver that receives the uplink control information.

* * * * *